(12) United States Patent
Zhu

(10) Patent No.: US 8,392,187 B2
(45) Date of Patent: Mar. 5, 2013

(54) DYNAMIC PRUNING FOR AUTOMATIC SPEECH RECOGNITION

(75) Inventor: Qifeng Zhu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 524 days.

(21) Appl. No.: 12/362,668

(22) Filed: Jan. 30, 2009

(65) Prior Publication Data
US 2010/0198597 A1 Aug. 5, 2010

(51) Int. Cl.
*G10L 19/04* (2006.01)
(52) U.S. Cl. ........ 704/236; 704/242; 704/231; 704/235; 704/251; 704/255
(58) Field of Classification Search .................. 704/236, 704/242, 231, 235, 251, 255
See application file for complete search history.

(56) References Cited

U.S. PATENT DOCUMENTS

| 5,799,065 A * | 8/1998 | Junqua et al. ............. 379/88.03 |
| 5,970,450 A * | 10/1999 | Hattori .......................... 704/239 |
| 2010/0169374 A1* | 7/2010 | Karacali-Akyamac et al. ............................ 707/780 |

OTHER PUBLICATIONS

Steinbiss, Volker / Tran, Bach-Hiep / Ney, Hermann (1994): "Improvements in beam search", In ICSLP-1994, 2143-2146.*

Jang J.S. R., and S.S. Lin, "Optimization of Viterbi Beam Search in Speech Recognition," In Proceedings of International Symposium on Chinese Spoken Language Processing, 2002, paper 114.*

Renals, S.; Hochberg, M.; "Efficient search using posterior phone probability estimates," Acoustics, Speech, and Signal Processing, 1995. ICASSP-95., 1995 International Conference on, May 9-12, 1995, pp. 596-599 vol. 1.*

Ney, Hermann, et al., "Progress in Dynamic Programming Search for LVCSR", Proceedings of the IEEE, vol. 88(8), Aug. 2000, pp. 1224-1240.

Young, Steve, et al., "The HTK Book," Cambridge University, Cambridge University Engineering Department, 2001-2006, pp. 1-368.

Balakrishnan, Sreeram, "Effect of Task Complexity on Search Strategies for the Motorola Lexicus Continuous Speech Recognition System", ICSLP '98 Abstract, Paper No. 295, 1 page, 1998.

Jang, Jyh-Shing Roger and Lin, Shivan-Sung, "Optimization of Viterbi Beam Search in Speech Recognition", Proceedings of the ISCSLP, 2002, pp. 177-180.

* cited by examiner

*Primary Examiner* — Qi Han
(74) *Attorney, Agent, or Firm* — Mirna Abyad; W. James Brady; Frederick J. Telecky, Jr.

(57) ABSTRACT

Methods, speech recognition systems, and computer readable media are provided that recognize speech using dynamic pruning techniques. A search network is expanded based on a frame from a speech signal, a best hypothesis is determined in the search network, a default beam threshold is modified, and the search network is pruned using the modified beam threshold. The search network may be further pruned based on the search depth of the best hypothesis and/or the average number of frames per state for a search path.

15 Claims, 8 Drawing Sheets

DYNAMIC PRUNING FOR AUTOMATIC SPEECH RECOGNITION

BACKGROUND OF THE INVENTION

There is growing consumer demand for embedded automatic speech recognition (ASR) in mobile electronic devices, such as mobile phones, dictation machines, PDAs (personal digital assistants), mobile games consoles, etc. For example, email and text message dictation, note taking, form filling, and command and control applications are all potential applications of embedded ASR. However, when a medium to large vocabulary is required, effective speech recognition for mobile electronic devices has many difficulties not associated with speech recognition systems in hardware systems such as personal computers or workstations. Firstly, the available power in mobile systems is often supplied by battery, and may be severely limited. Secondly, mobile electronic devices are frequently designed to be as small as practically possible. Thus, the memory and resources of such mobile embedded systems tends to be very limited, due to power and space restrictions. The cost of providing extra memory and resources in a mobile electronic device is typically much higher than that for a less portable device without this space restriction. Thirdly, the mobile hardware may be typically used in a noisier environment than that of a fixed computer, e.g. on public transport, near a busy road, etc. Thus, a more complex speech model and more intensive computation may be required to obtain adequate speech recognition results.

Recognizing an utterance in a speech signal requires searching a two dimensional grid of frame indexes (time) and potential models (words) to determine the best path that matches the utterance and the models. The best path, i.e., the path with the highest probability, determines the result of the recognition. The Viterbi time synchronous search algorithm based on dynamic programming is widely used in ASR. However, if this search algorithm is used without modification, the search space is very large and thus requires a lot of memory. This is because at every frame, the path information associated with nearly all possible models/states must be memorized. Further, the large search space requires a lot of Gaussian computation to compute the likelihood of a frame with all active hypotheses at all active paths, and performance may be unacceptable.

Pruning is introduced to this process to reduce the size of the search space by constraining the search to models with high probability. Pruning approaches typically result in significant reduction in memory requirements and CPU time. The challenge for pruning is how to significantly reduce the search space without pruning the correct search path out of the search space. When resources are not critical, usually a safe pruning with a large margin is applied. Currently, the two primary pruning technologies used in ASR are beam pruning and rank pruning. Both pruning techniques try to pick the most likely hypotheses, i.e., the hypothesized model, at each frame. With beam pruning, the best hypothesis is first identified. Each of the other hypotheses is then compared with this best hypothesis and if the difference between the two is below a predetermined threshold, TH, i.e., the beam width, the hypothesis survives the pruning; otherwise, it is pruned out of the search process. In rank pruning, a predetermined number, N, of surviving hypotheses is chosen and at every frame and only these top N hypotheses are retained.

While both beam pruning and rank pruning both reduce the memory requirements and computations needed to perform the searches, better pruning techniques for ASR are desirable to make efficient use of the limited memory and CPU resources of mobile electronic devices.

SUMMARY OF THE INVENTION

Embodiments of the invention provide methods, speech recognition systems, and computer readable media for recognizing speech using dynamic pruning techniques. In one or more embodiments of the invention, a method for automatic speech recognition includes receiving a frame of a speech signal, expanding a search network based on the frame, determining a best hypothesis in the search network modifying a beam threshold based on a time the frame was received to produce a modified beam threshold, and pruning the search network using the best hypothesis and the modified beam threshold.

Further, in one or more embodiments of the invention, a speech recognition system includes a microphone configured to receive a speech signal, a frame constructor configured to create a plurality of frames from the speech signal, a feature extractor configured to produced feature vectors from the frames, and a decoder configured to expand a search network based on a frame, determine a best hypothesis in the search network, modify a default beam threshold to produce a modified beam threshold, and prune the search network using the modified beam threshold and the best hypothesis.

In addition, in one or more embodiments of the invention, a computer readable medium includes executable instructions to recognize speech when executed by a processor in a digital system by expanding a search network based on a frame constructed from a speech signal, determining a best hypothesis in the search network, modifying a default beam threshold to produce a modified beam threshold, and pruning the search network using the modified beam threshold and the best hypothesis.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
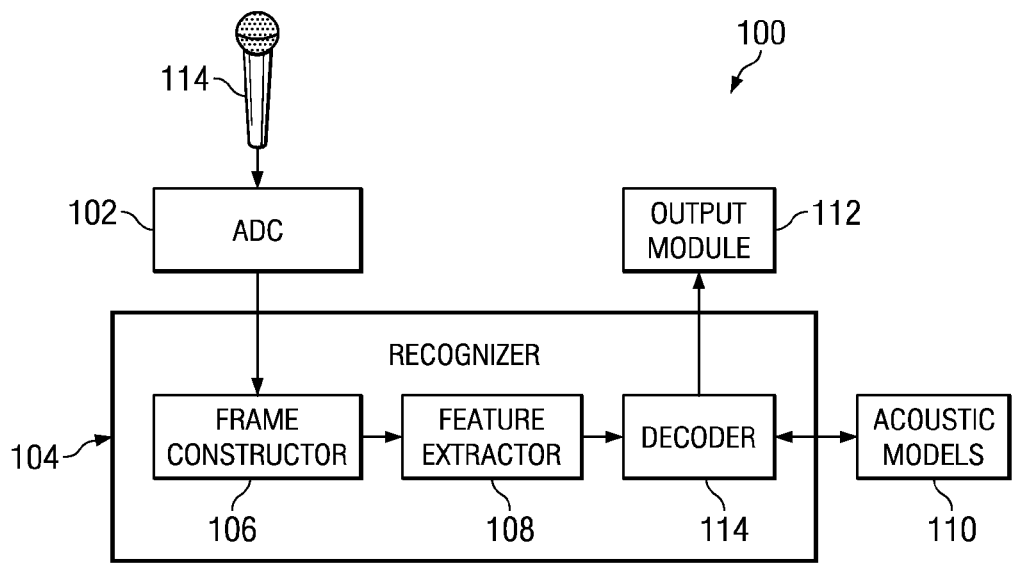
FIG. 1 is a block diagram an automatic speech recognition system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Embodiments of the invention provide methods and systems for dynamic pruning of the search space during automatic speech recognition (ASR). Instead of using a fixed pruning threshold to determine which hypotheses are to be pruned, a dynamically determined pruning threshold is used. In embodiments of the invention, the pruning threshold may change from frame to frame linearly with time, based on the speed with which the search space is increasing, and/or the number of active phones. Further, in some embodiments of the invention, the search space may be further pruned based on the search depth of the best hypothesis, and/or the ratio of the frame index to the search depth of a search path. Experimental results have shown that the use of these five dynamic pruning techniques may reduce the required search space and Gaussian computations by more than 55% over beam pruning using a fixed threshold with significant loss of recognition performance.

FIG. 1 is a block diagram of a speech recognition system configured to use dynamic pruning for automatic speech recognition in accordance with one or more embodiments of the invention. The components of the speech recognition system (100) include a microphone (114), an analog-to-digital converter (ADC) (102), a recognizer (104), acoustic models (110), and an output module (112). The microphone (114) receives speech utterances in the form of audio signals that are provided to the ADC (102). The ADC (102) converts the analog audio signals from the microphone (114) into a digital audio signal. The digital signal is then provided to the recognizer (104).

The recognizer (104) includes functionality to recognize speech in the digital audio signal using the acoustic models (110) and to provide the recognized speech to the output module (112). In one or more embodiments of the invention, the acoustic models (110) include hidden Markov models (HMMs). The recognizer (104) further includes functionality to use one or more of the methods for dynamic pruning described herein to prune the search space as speech is being recognized. In one or more embodiments of the invention, the recognizer (104) includes a frame constructor (106), a feature extractor (108), and a decoder (114). The frame constructor (106) receives the digital audio signal from the ADC (102), creates frames of audio data from the signal, and provides the constructed frames to the feature extractor (108). The feature extractor (108) extracts features from each frame. In one or more embodiments of the invention, the feature extractor (108) may use any suitable feature extraction technique, such as, for example, linear predictive coding (LPC), LPC derived cepstrum, perceptive linear prediction (PLP), auditory model feature extraction, and mel-frequency cepstrum coefficients (MFCC) feature extraction.

The feature extractor (108) produces a stream of feature vectors that are each associated with a frame of speech. This stream of feature vectors is provided to the decoder (114). The decoder (114) uses these feature vectors along with the acoustic models (110) to recognize words. More specifically, in one or more embodiments of the invention, the decoder (114) includes functionality to expand a search network based on the feature vectors and use a Viterbi time synchronous search algorithm to determine the best hypothesis for each frame. Further, the decoder (114) includes functionality to use one or more of the dynamic pruning techniques described herein to prune the search space during the decoding. In one or more embodiments of the invention, the recognizer (104) includes a processor (e.g., a digital signal processor) that executes software instructions to perform frame construction, feature extraction, and decoding.

The dynamic pruning techniques used by the decoder (114) may include dynamically modifying a pruning threshold used in a beam search and/or pruning based on search depth and/or pruning based on the ratio of a frame index to search depth. The dynamic modifications to the pruning threshold may include linearly increasing the pruning threshold over time, adjusting the pruning threshold based on based on the speed with which the search space is increasing, and/or adjusting the pruning threshold based on the number of active phones. In various embodiments of the invention, any combination of these pruning techniques may be used by the decoder (114). Each of these pruning techniques is described in more detail below. Each of these pruning techniques used thresholds and or constants that are empirically determined. In one or more embodiments of the invention, the thresholds and constants are determined using a database of speech signals recorded in a vehicle under various conditions. Further, in one or more embodiments of the invention, the decoder (114) may also use other pruning techniques in conjunction with those described herein, such as, for example, HMM end pruning and word end pruning.

At time T in recognizing speech from a sequence of frames, the accumulative log likelihood is the sum of the frame likelihood of every prior frame in the sequence:

$$L(O_T \mid Q) = \sum_{t=1\ldots T} L(o(t) \mid q_t) \rho_t \qquad (1)$$

where $L(O_T|Q)$ is the log likelihood up to time T, $L(o(t)|q_t)$ is the log likelihood of frame t at certain state $q_t$, $\rho_t$ is the log transition probability at time t, and Q is a certain path made of $q_1 \ldots q_T$. The term inside the summation can be regarded as a random variable with certain variance. Thus, the variance of the summation increases as T increases. Under this assumption, the variance of $L(O_T|Q)$ increases linearly with time.

In a typical beam search, the difference of the $L(O_T|Q)$ between the best path, i.e., the best hypothesis, $Q_{best}$ and $Q_x$ is tested with a fixed, predetermined threshold. This scheme may introduce errors as initially, the fixed threshold may be too large, since most of the log likelihoods are close to each other due to small variance; later in the frame sequence (often after 20 frames), this threshold may be too small.

Accordingly, in one or more embodiments of the invention, the beam pruning threshold TH, i.e., the beam threshold, is adjusted linearly with time for a predetermined number of initial frames in an utterance, where the frame count starts with the initial frame of the utterance, frame 0:

$$TH = \alpha \cdot t \quad (2)$$

where t is the frame number and a is an empirically determined constant.

The constant $\alpha$ is the default beam pruning threshold and is determined empirically. In addition, TH is reset after each utterance is recognized. Further, the predetermined number of frames is also determined empirically. In one or more embodiments of the invention, the predetermined number of frames is twenty. In such embodiments, the beam threshold is no longer increased after the 20$^{th}$ frame because of the result of pruning also reduces the variances of the surviving hypothesis (i.e., paths). Thus, the previously mentioned assumption of a linear increase of the variances of the surviving paths may no longer hold after the 20$^{th}$ frame. Once the predetermined number of frames is processed, this modification to the beam threshold is no longer applied.

In one or more embodiments of the invention, the beam threshold may also be modified based on how fast the size of the search space, i.e., the search network, is increasing as a sequence of speech frames is recognized. How fast the size of the search space is increasing may be determined by $$S(t) = \frac{\partial (\# \text{ of active } hyps)}{\partial t} \quad (3)$$
$$= \# \text{ active } hyps \text{ at}(t) - \# \text{ active } hyps \text{ at } (t-1)$$
$$= N(t) - N(t-1)$$
$$A(t) = S(t) - S(t-1) \quad (4)$$

where S(t) is the speed of the search space increase, and A(t) is the acceleration of the increase for the current frame.

Figure 2A:
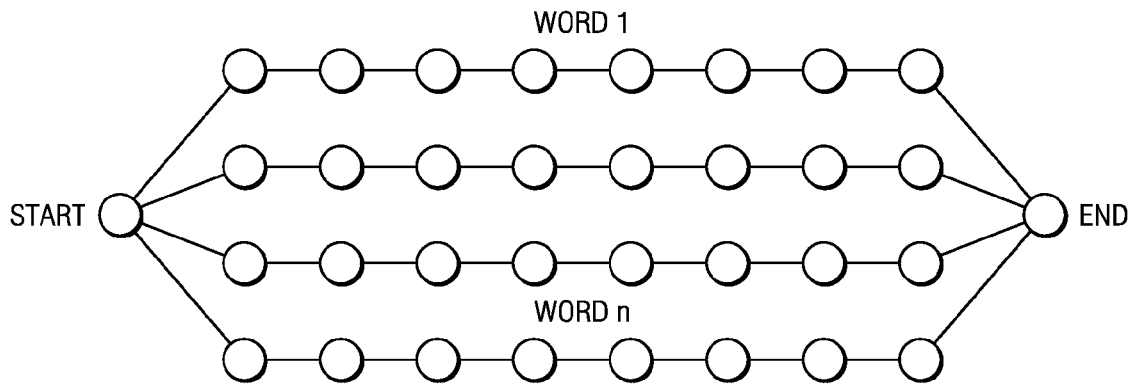
FIGS. 2A-2E are examples of search spaces in accordance with one or more embodiments of the invention.
Figure 2B:
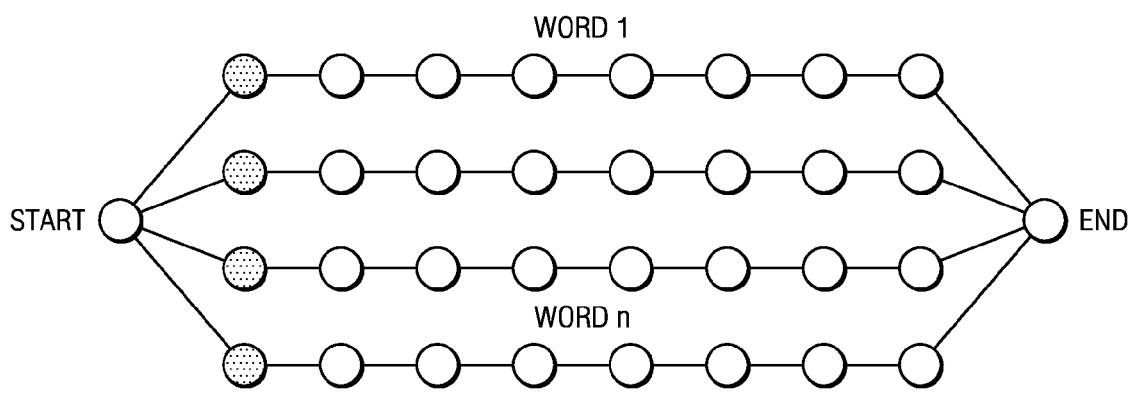
Figure 2C:
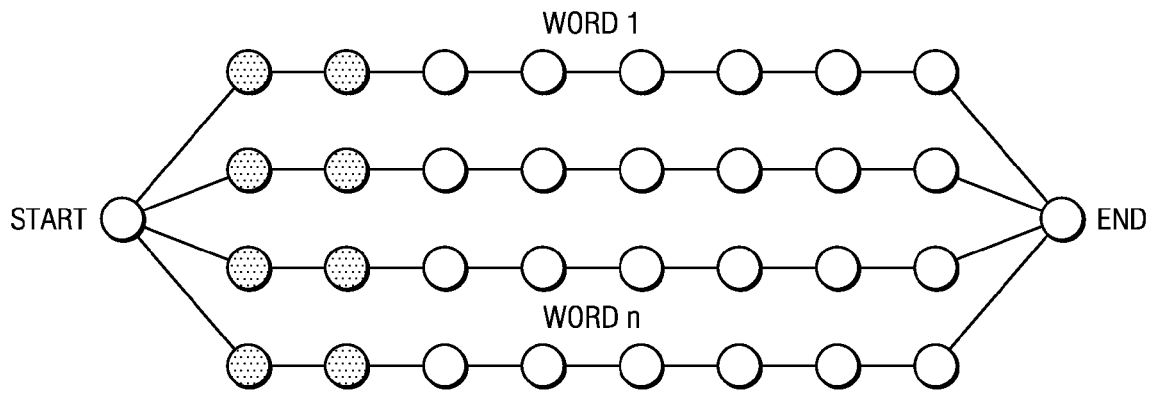
Figure 2D:
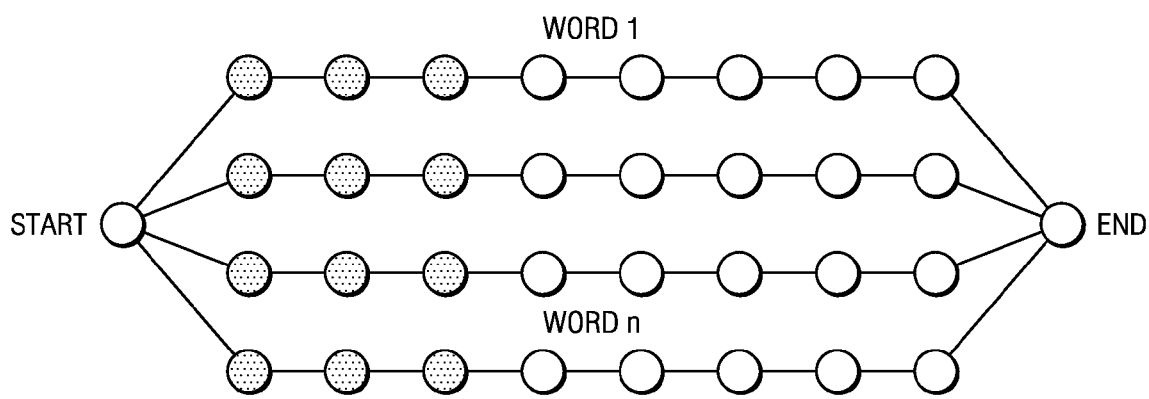

For example, in automatic speech recognition for name dialing, a grammar may have a flat structure as shown in FIG. 2A, which contains four names in parallel. Each circle in the figure represents an HMM state. Without good constraints, there may be a linear increase of the search space across time. For example, as shown in FIGS. 2B-2D, during decoding, at the first frame, all of the first states of the four names become active (FIG. 2B), in the second frame, all the first and second states of the four names become active (FIG. 2C), and at the third frame, all of the first, second, and third states become active (FIG. 2D). The grown of the search space may keep increasing linearly for each subsequent frame. Referring to equations 3 and 4 above, for this example, N(1)=4; N(2)=8; N(3)=12; S(1)=4; S(2)=4, S(3)=4; A(2)=A(3)=0.

Either S(t) or A(t) may be used to directly adjust the beam threshold to mitigate the linear increase in the size of the search space. In one or more embodiments of the invention, if A(t) exceeds a predetermined acceleration threshold, Th_a, then the beam threshold is adjusted by a delta amount:

$$TH_2 = TH + \text{delta} \quad (5)$$

The predetermined acceleration threshold and delta are constants that are empirically determined. While equation (5) assumes that the linear time adjustment of equation (4) is also applied, one of ordinary skill in the art will understand embodiments in which the linear time adjustment is not applied.

In one or more embodiments of the invention, the beam threshold may also be adjusted based on the number of active phones. In phone based HMM, the search algorithm identifies a phone hypothesis at the last HMM state. In another words, it is a phone level hypothesis, compared to the state level hypothesis mentioned above. Because different states are used in different HMMs, the number of active phones carries better physical meaning.

The beam threshold is adjusted, more specifically, reduced, if the number of active phones exceeds a predetermined active phone threshold, TH_ph. This predetermined active phone threshold, which is determined empirically, is related to the number of names in the grammar, e.g., the number of parallel paths in FIG. 1. This active phone threshold represents the largest number of active hypotheses the decoder (114) can handle.

The adjustment to the beam threshold based on the number of active phones is:

$$TH_3 = TH_2 - a*(\min(0, \# \text{ active phones} - TH\_ph)) \quad (6)$$

where a is an empirically determined constant. While equation (6) assumes that the linear time adjustment of equation (4) and the acceleration adjustment of equation 5 are both also applied, one of ordinary skill in the art will understand embodiments in which the linear time adjustment and/or the acceleration adjustments are not used.

Figure 2E:
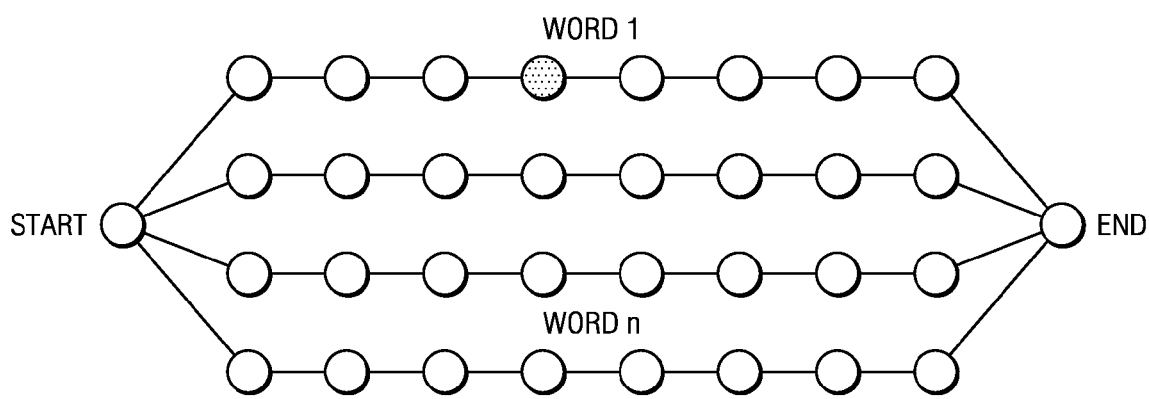

Once the beam threshold has been adjusted using one or more of the techniques above, the decoder (114) uses the resulting beam threshold and the best hypothesis to prune the search network. As previously mentioned, the decoder (114) may also dynamically prune the search network using pruning techniques that do not involve adjusting the beam threshold. In one such pruning technique, search depth is used to prune the search network. Search depth, i.e., the number of HMM states from the starting state to a state under consideration, affects the size of the search network. For example, the search network shown in FIG. 2E has a search depth of 4.

In this pruning technique, the search depth of the best path identified by the beam search is determined and a predetermined search depth threshold, TH_sd, is used to limit the search depth of other paths compared to the best path. That is, if another path in the search network has a search depth that exceeds the search depth of the best path by more than the search depth threshold, that path will be pruned. The predetermined search depth threshold is empirically determined. In one or more embodiments of the invention, this pruning technique may be applied in conjunction with one or more of the techniques for adjusting the beam threshold described above.

Another pruning technique uses a predetermined ratio of the frame index to the search depth, i.e., the average number of frames per state for a search path, to constrain the search space. Intuitively, even before approaching the end of a search, if a path has only one frame per HMM state, the likelihood of the path is quite low unless the speech is extremely fast. In one or more embodiments of the invention, the predetermined average number of frames per state is determined empirically based on speech at a normal rate. In some embodiments of the invention, the predetermined average number of frames per state is empirically determined based on speaking a person's name for voice dialing. An average number of frames per state threshold, TH_x, which is also determined empirically, is used to prune paths out of the search space that have too high or too low an average number of frames per state as compared to the predetermined average number of frames per state. More specifically, if the average number of frames per state for a path does not fall with a range determined by the predetermined average number of frames per state plus or minus TH_x, the path is removed from the search space. In one or more embodiments of the invention, this pruning technique may be applied in conjunction with one or more of the techniques for adjusting the beam threshold described above and/or the search depth pruning technique.

Figure 3:
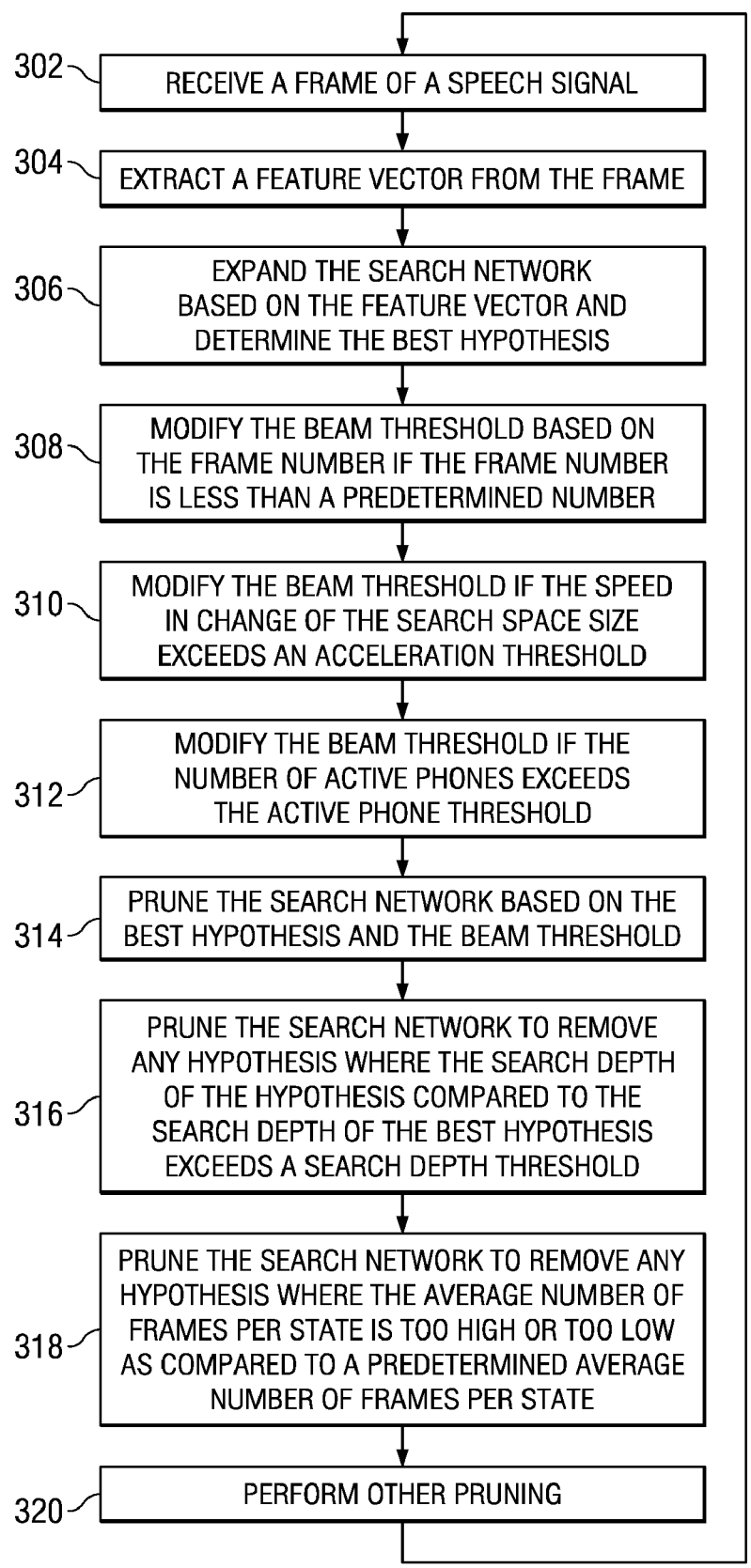
FIG. 3 is a flow diagram of a method in accordance with one or more embodiments of the invention.

FIG. 3 shows a flow diagram of a method for dynamic pruning in automatic speech recognition in accordance with one or more embodiments of the invention. Initially, a frame of an utterance in a speech signal is received (302). A feature vector is then extracted from the frame (304), a search network is expanded based on the feature vector, and the best hypothesis is determined (306). The beam threshold is then modified based on the frame number of the frame (as described above) if the frame number is less than a predetermined number (308). In one or more embodiments of the invention, the predetermined number is twenty. In one or more embodiments of the invention, if the frame is the first frame of the utterance, the beam threshold is the predetermined default beam threshold and the frame number is 0. For each subsequent frame in the utterance, the frame number is incremented by one.

The beam threshold is further modified as described above if the speed in change of the search space size exceeds a predetermined acceleration threshold (310). The beam threshold is additionally modified as described above if the number of active phone exceeds a predetermined active phone threshold (310). The resulting beam threshold and the best hypothesis are then used to prune the search network (314).

The resulting search network is then further pruned as described above to remove any hypothesis where the search depth of the hypothesis compared to the search depth of the best hypothesis exceeds a predetermined search depth threshold (316). The resulting search network is also further pruned as described above to remove any hypothesis where the average number of frames per state is too high or too low as compared to a predetermined average number of frames per state (318). Other pruning techniques, such as HMM end pruning and word end pruning, may also be applied to dynamically pruned search network (320).

The process is then repeated for the next speech frame. Once all frames in the utterance are recognized, the beam threshold is reset to the predetermined beam threshold (not specifically shown).

Experimental results show that the use of the pruning techniques described herein may reduce the search space more than 55% when used together. The experiments used a speaker independent name dialing ASR task with a database of speech signals recorded in a vehicle, using an AKG M2 hands-free distant talking microphone, in three recording sessions: parked (car parked, engine off), stop-n-go (car driven on a stop and go basis), and highway (car driven on a highway). The acoustic models were trained for a fixed point ASR system. The task includes 20 speakers, each with 120 utterances. Each utterance is one of 90 names.

Figure 4A:
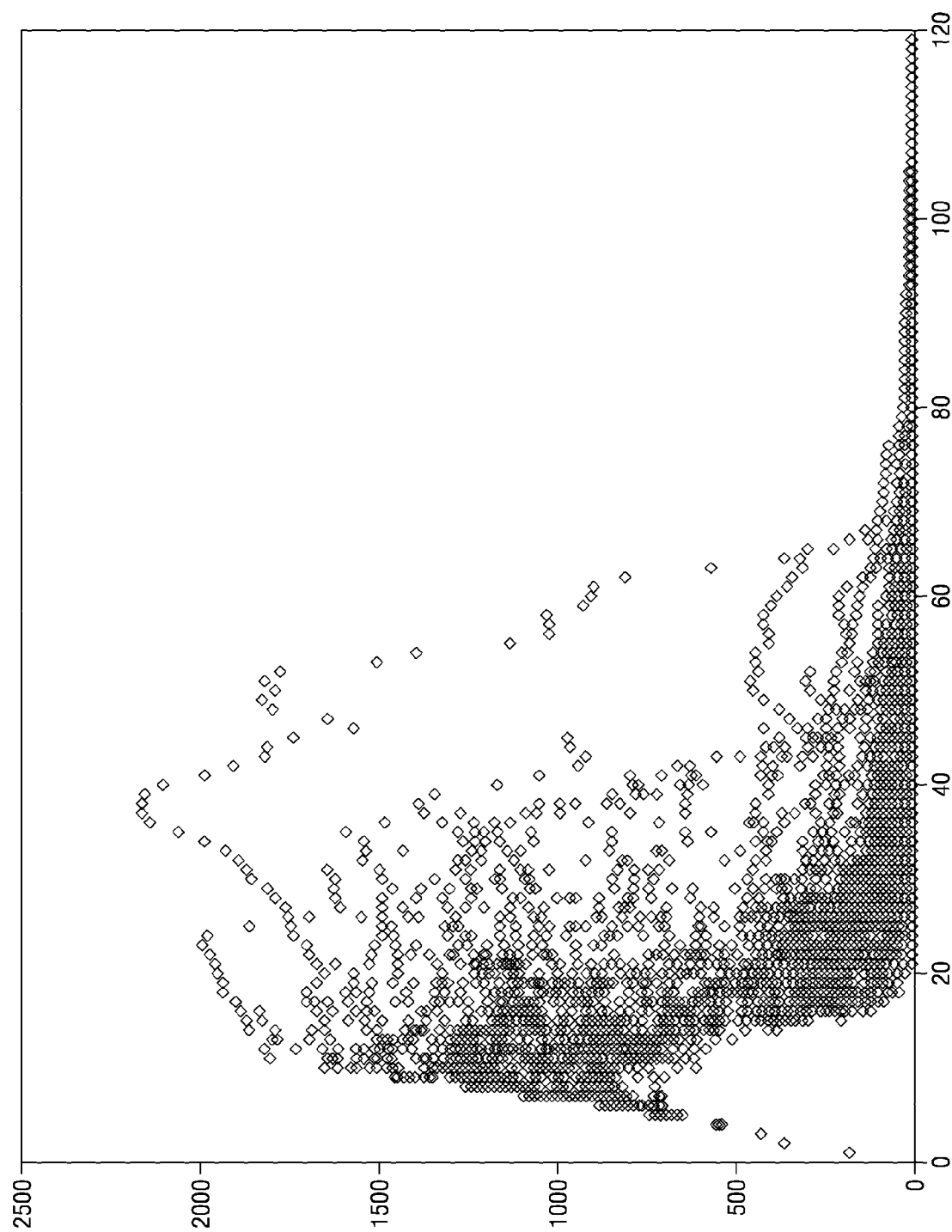
FIGS. 4A-4C are graphs of experimental results in accordance with one or more embodiments of the invention.

FIG. 4A is a graph showing time vs. search space size for 120 utterances from one speaker using beam pruning with a fixed threshold. In this graph, the x-axis is the frame index and the y-axis is the search space represented as the number of active hypotheses. As can be seen from this graph, at first, the confusion is high, and the search space increases linearly with time. The search space starts to decrease after the $10^{th}$ frame.

Figure 4B:
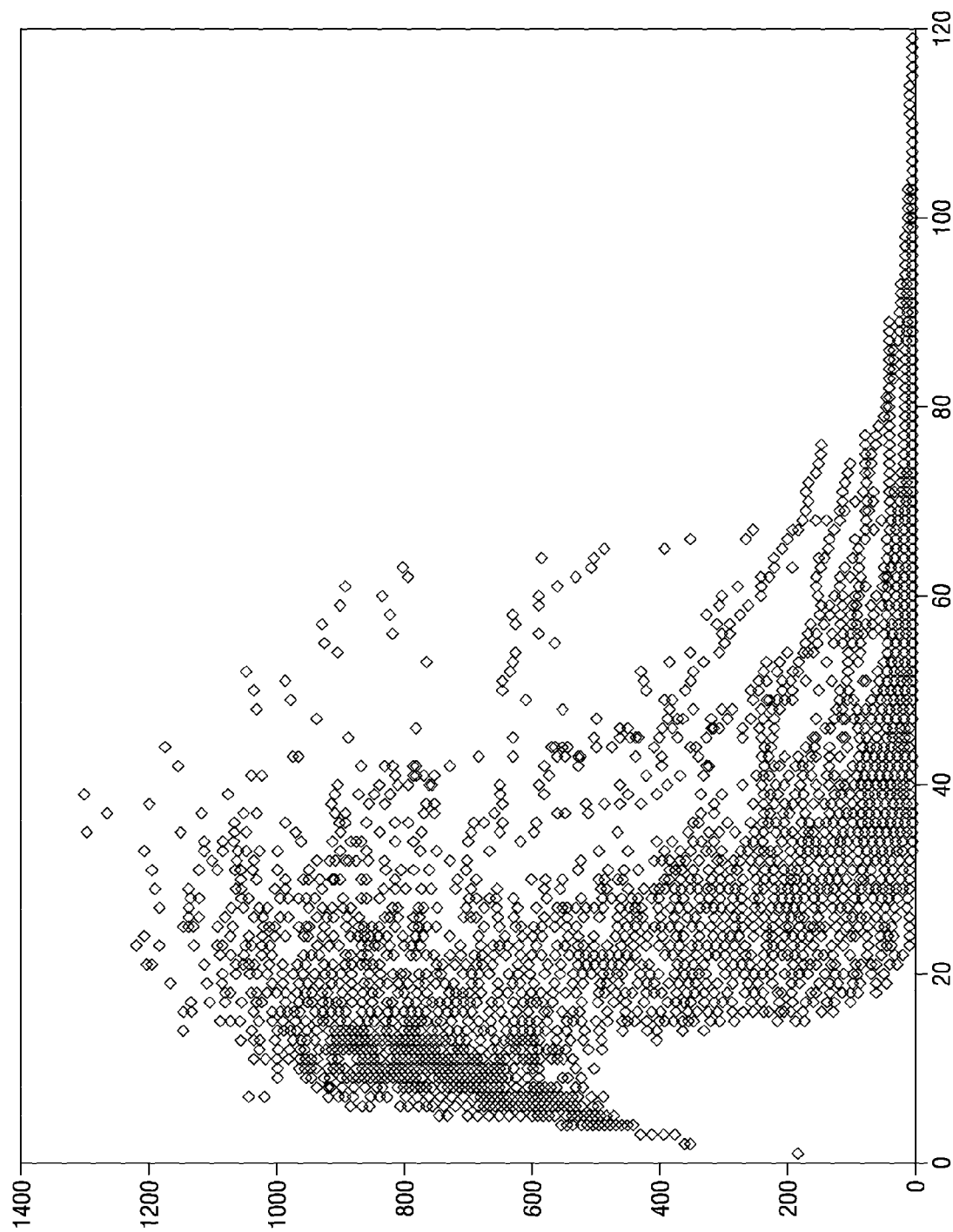

FIG. 4B shows a graph of the search space over time for the same utterances of the same speaker as FIG. 4A where the pruning techniques described herein are applied. As can be seen from this graph, overall the search space is greatly reduced. Also, as can be seen in the graph of FIG. 4A, at the $10^{th}$ frame, where the maximal confusion happens, the search space is from 800 to 1800 active hypotheses. Using the pruning techniques described herein, the search space at the $10^{th}$ frame is reduced to 500 to 1000 active hypotheses as shown in the graph of FIG. 4B.

Figure 4C:
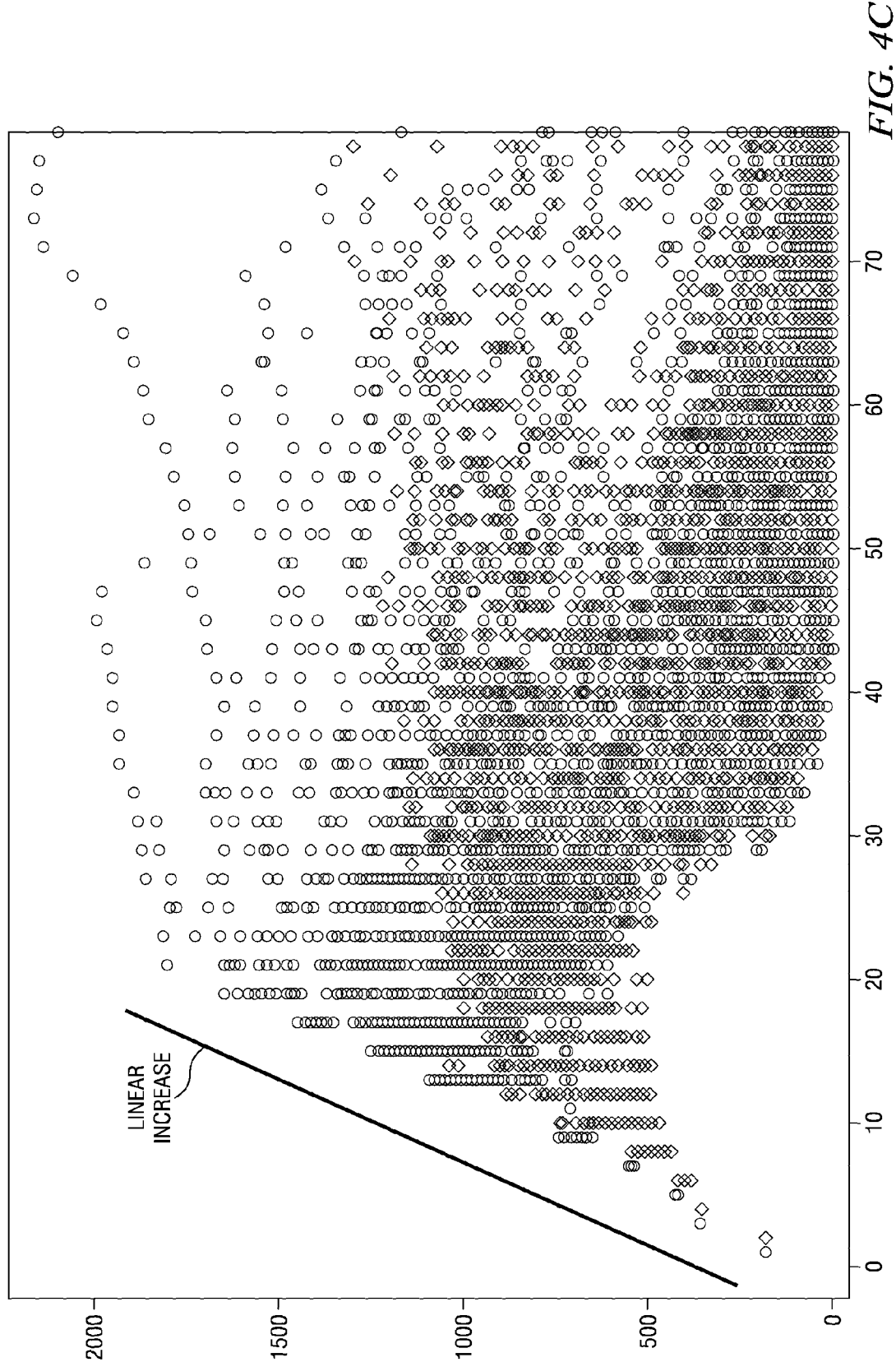

FIG. 4C shows a graph comparing the two different pruning methods at the beginning of the search. The circles represent beam pruning using a fixed threshold, and the crosses represent use of the pruning techniques described herein. This graph shows that beam pruning with a fixed threshold doe not constrain the increase of the search space very well and the size of the search space increases linearly. With the pruning techniques described herein, the increase in the size of the search space is slower.

Table 1 summarizes the entire recognition experiment of the 20 speakers at three noise conditions: highway, stop-and-go, and parked condition. The word error rate (WER) at the different conditions with different pruning methods is shown. The measure of the search space is the number of Gaussian computations per frame (GPF), which is directly related to the size of the search space. The results in Table 1 show that the size of the search space may be reduced by more than 55% by using the dynamic pruning techniques described herein.

TABLE 1

|  | Highway | | Stop and go | | Parked | |
| --- | --- | --- | --- | --- | --- | --- |
|  | WER | GPF | WER | GPF | WER | GPF |
| Fixed Beam Pruning | 2.66 | 8200 | 0.73 | 2758 | 0.53 | 2158 |
| Dynamic Pruning | 2.66 | 3532 | 0.77 | 1873 | 0.61 | 1539 |

Figure 5:
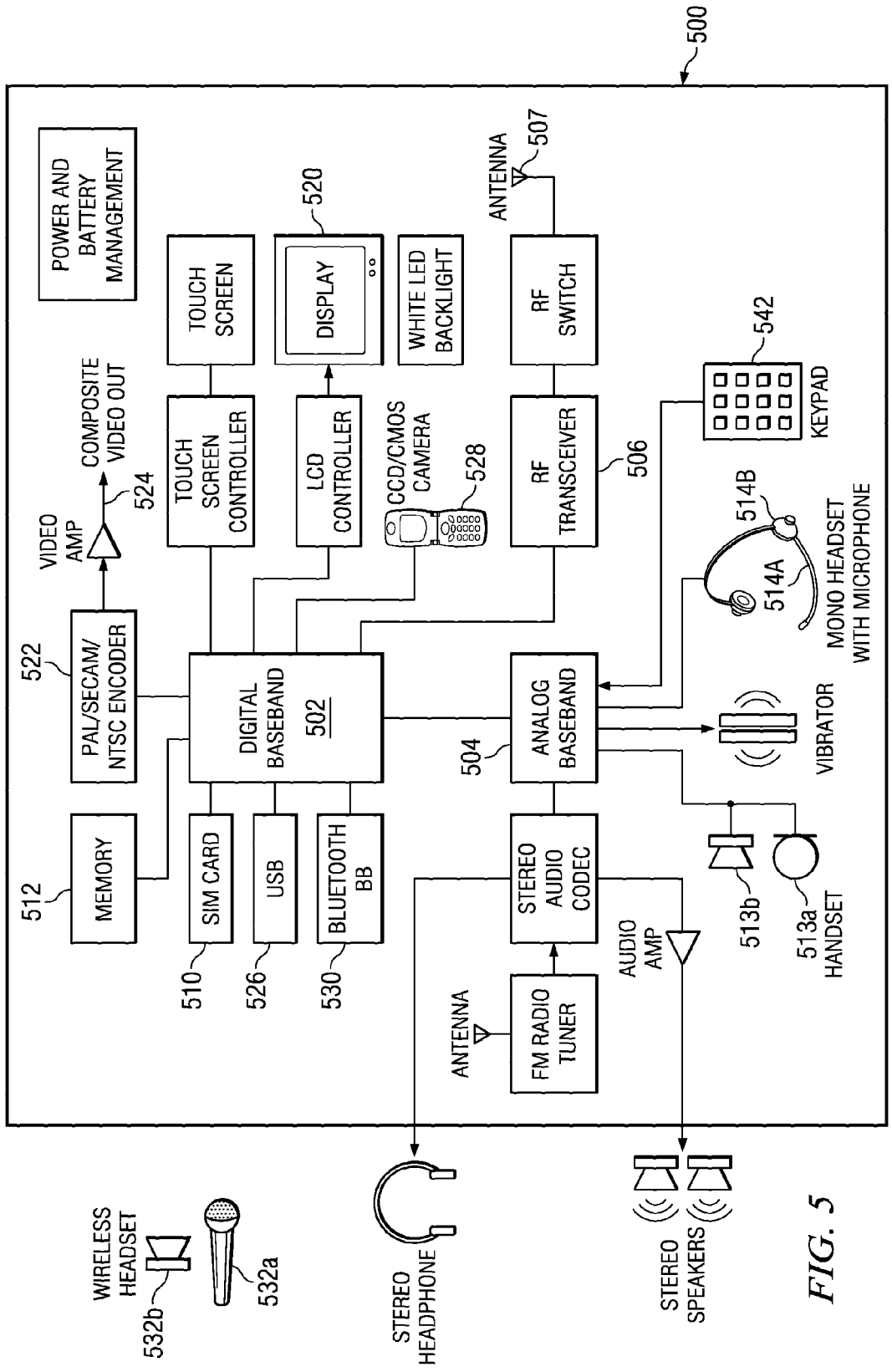
FIG. 5 shows a block diagram of a mobile device in accordance with one or more embodiments of the invention.

FIG. 5 is a block diagram of a mobile device (e.g., a mobile cellular telephone) (500) configured to perform automatic speech recognition using the dynamic pruning techniques described herein. The digital baseband (DBB) unit (502) can include a digital processing processor system (DSP) that includes embedded memory and security features. The analog baseband unit (504) receives a voice data stream from handset microphone (513a) and sends a voice data stream to the handset mono speaker (513b). The analog baseband unit (504) also receives a voice data stream from the microphone (514a) and sends a voice data stream to the mono headset (514b). The voice data streams from either of these microphones may be used for automatic speech recognition in which the modified SVA is used. Usually, the analog baseband unit (504) and the digital baseband unit (502) are separate ICs. In many embodiments, the audio baseband unit (504) does not embed a programmable processor core, but performs processing based on configuration of audio paths, filters, gains, etc being setup by software running on the DBB (502). In some embodiments, the audio baseband processing is performed on the same processor that performs DBB processing. In other embodiments, a separate DSP or other type of processor performs the audio baseband processing.

The RF transceiver (506) includes a receiver for receiving a stream of coded data frames and commands from a cellular base station via an antenna (507) and a transmitter for transmitting a stream of coded data frames to the cellular base station via the antenna (507). The RF transceiver (506) is connected to the DBB (502) which provides processing of the frames of encoded data being received and transmitted by the cellular telephone (500).

The DBB unit (502) may send or receive data to various devices connected to universal serial bus (USB) port (526). The DBB (502) is connected to the subscriber identity module (SIM) card (510) and stores and retrieves information used for making calls via the cellular system. The DBB (502) is also connected to the memory (512) that augments the onboard memory and is used for various processing needs. The DBB (502) is connected to Bluetooth baseband unit (530) for wireless connection to a microphone (532a) and headset (532b) for sending and receiving voice data. The DBB (502) is connected to display (520) and can send information to it for interaction with a user of the cellular telephone (500) during a call process or other processing. The display (520) may also display pictures received from the network, from a local camera (528), or from other sources such as the USB (526). The DBB (502) may also send a video stream to the display (520) that is received from various sources such as the cellular network via the RF transceiver (506) or the camera (526). The DBB (502) may also send a video stream to an external video display unit via the encoder (522) over a composite output terminal (524). The encoder unit (522) may provide encoding according to PAL/SECAM/NTSC video standards.

Automatic speech recognition of speech signals received from the various microphones that uses the dynamic pruning techniques described herein may be implemented by instructions stored in the memory (512) and executed by the DBB (502). More specifically, the frame constructor, feature extractor, and decoder as discussed in reference to FIG. 1 may be implemented by instructions stored in the memory (512). Further, the acoustic models used for speech recognition may be stored in the memory (512).

Figure 6:
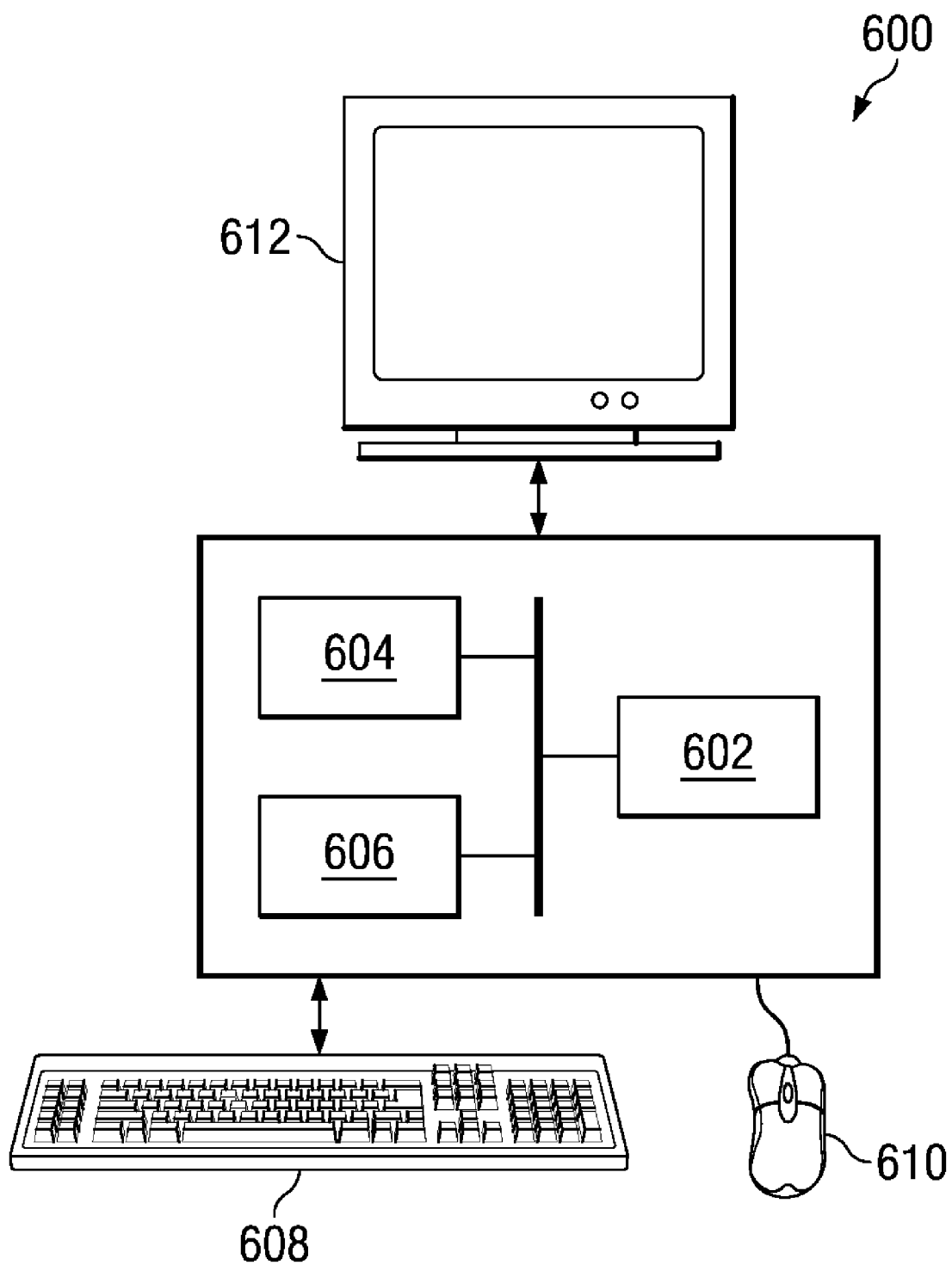
FIG. 6 shows an illustrative digital system in accordance with one or more embodiments of the invention.

FIG. 6 is a block diagram of an illustrative digital system (600) configured to perform automatic speech recognition using dynamic pruning techniques described herein. The digital system (600) includes a processor (602), associated memory (604), a storage device (606), and numerous other elements and functionalities typical of today's digital systems (not shown). In one or more embodiments of the invention, a digital system may include multiple processors and/or one or more of the processors may be digital signal processors. The digital system (600) may also include input means, such as a keyboard (608) and a mouse (610) (or other cursor control device), and output means, such as a monitor (612) (or other display device). The digital system ((600)) may also include microphone (not shown) for receiving speech signals. The digital system (600) may be connected to a network (614) (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (600) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform automatic speech recognition using embodiments of the invention described herein may be stored on a computer readable medium such as a compact disc (CD), a diskette, a tape, a file, or any other computer readable storage device. The software instructions may be distributed to the digital system (600) via removable memory (e.g., floppy disk, optical disk, flash memory, USB key), via a transmission path (e.g., applet code, a browser plug-in, a downloadable standalone program, a dynamically-linked processing library, a statically-linked library, a shared library, compilable source code), etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method for automatic speech recognition, the method comprising:
   receiving a frame of a speech signal;
   expanding, by a processor, a search network based on the frame;
   determining, by the processor, a best hypothesis in the search network;
   modifying, by the processor, a beam threshold based on a time the frame was received to produce a modified beam threshold, wherein modifying a beam threshold further comprises modifying the beam threshold based on a speed with which the search network is increasing in size; and
   pruning, by the processor, the search network using the best hypothesis and the modified beam threshold.

2. The method of claim 1, wherein modifying a beam threshold based on a time the frame was received further comprises increasing the beam threshold linearly with time for a predetermined number of frames.

3. The method of claim 1, wherein modifying the beam threshold based on a speed further comprises increasing the beam threshold by an empirically determined amount if an acceleration of the speed of the size increase for the frame exceeds an empirically determined threshold.

4. The method of claim 1 wherein modifying a beam threshold further comprises modifying the beam threshold based on a number of active phones.

5. The method of claim 4, wherein modifying a beam threshold based on a number of active phones further comprises further comprises reducing the beam threshold if the number of active phones is greater than an empirically determined threshold.

6. The method of claim 1, further comprising:
   pruning the search network based on a search depth of the best hypothesis.

7. The method of claim 1, further comprising:
   pruning the search network based on an empirically determined average number of frames per state for a search path.

8. A speech recognition system comprising:
   a microphone configured to receive a speech signal;
   a frame constructor configured to create a plurality of frames from the speech signal;

a feature extractor configured to produced feature vectors from the frames; and a decoder configured to:
  expand a search network based on a frame;
  determine a best hypothesis in the search network;
  modify a default beam threshold to produce a modified beam threshold, wherein modifying a default beam threshold further comprises modifying the default beam threshold based on at least one selected from a group consisting of: a time the frame is received, a speed with which the search network is increasing in size, and a number of active phones, wherein the default beam threshold is increased by an empirically determined amount if an acceleration of the speed with which the search network is increasing in size for the frame exceeds an empirically determined amount; and
  prune the search network using the modified beam threshold and the best hypothesis.

9. The speech recognition system of claim 8, wherein the time the frame is received is used to increase the default beam threshold for a predetermined number of frames.

10. The speech recognition system of claim 8, wherein the beam threshold is reduced if the number of active phone is greater than an empirically determined threshold.

11. The speech recognition system of claim 8, wherein the decoder is further configured to prune the search network based on a search depth of the best hypothesis.

12. The speech recognition system of claim 8, wherein the decoder is further configured to prune the search network based on an empirically determined average number of frames per state for a search path.

13. The speech recognition system of claim 8, wherein the speech recognition system is comprised in a mobile device.

14. The speech recognition system of claim 8, wherein the executable instructions further recognize speech by pruning the search network based on an empirically determined average number of frames per state for a search path.

15. A non-transitory computer readable medium comprising executable instructions to recognize speech when executed by a processor in a digital system by:
  expanding a search network based on a frame constructed from a speech signal;
  determining a best hypothesis in the search network;
  modifying a default beam threshold to produce a modified beam threshold, wherein modifying a default beam threshold further comprises modifying the default beam threshold based on at least one selected from a group consisting of: a time the frame is received, a speed with which the search network is increasing in size, and a number of active phones; and
  pruning the search network using the modified beam threshold and the best hypothesis and based on a search depth of the best hypothesis.

* * * * *